(12) United States Patent
Gong et al.

(10) Patent No.: US 7,199,917 B2
(45) Date of Patent: Apr. 3, 2007

(54) MICRO-MIRROR ELEMENT WITH DOUBLE BINGE

(75) Inventors: Cuiling Gong, Plano, TX (US); Rabah Mezenner, Richardson, TX (US)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 11/108,259

(22) Filed: Apr. 18, 2005

(65) Prior Publication Data
US 2006/0245031 A1  Nov. 2, 2006

(51) Int. Cl.
*G02B 26/00* (2006.01)

(52) U.S. Cl. ........................ 359/291; 359/292
(58) Field of Classification Search .............. 359/290, 359/291, 292, 295, 298, 222, 223, 224, 320, 359/332

See application file for complete search history.

(56) References Cited

U.S. PATENT DOCUMENTS 6,618,186 B2 *  9/2003  Kaeriyama .................. 359/292
2003/0142382 A1 *  7/2003  DiCarlo ...................... 359/223

* cited by examiner

*Primary Examiner*—Ricky Mack
*Assistant Examiner*—Tuyen Tra
(74) *Attorney, Agent, or Firm*—Dawn V. Stephens; W. James Brady, III; Frederick J. Telecky, Jr.

(57) ABSTRACT

According to one embodiment of the present invention a micro-mirror element comprises a lower layer, a first middle layer, a second middle layer, and a micro-mirror. The lower layer includes an address portion for receiving an address voltage and a bias portion for receiving a bias voltage respectively. The first middle layer is electrically coupled to the bias portion of the lower layer. The second middle layer is electrically coupled to the first middle layer. The micro-mirror is coupled to the second middle layer and comprises a reflective surface operable to selectively tilt, in response to an application of a bias voltage and an address voltage to the lower layer, to reflect a beam of light.

20 Claims, 6 Drawing Sheets

Figure 1:
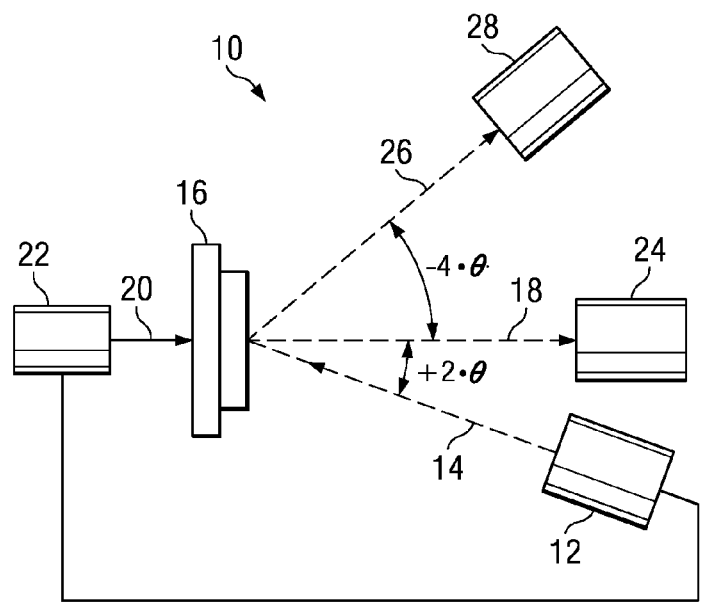

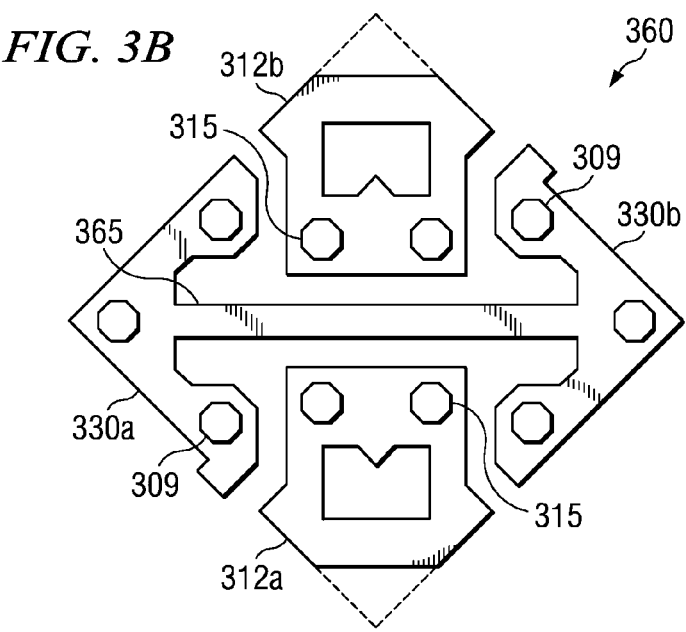
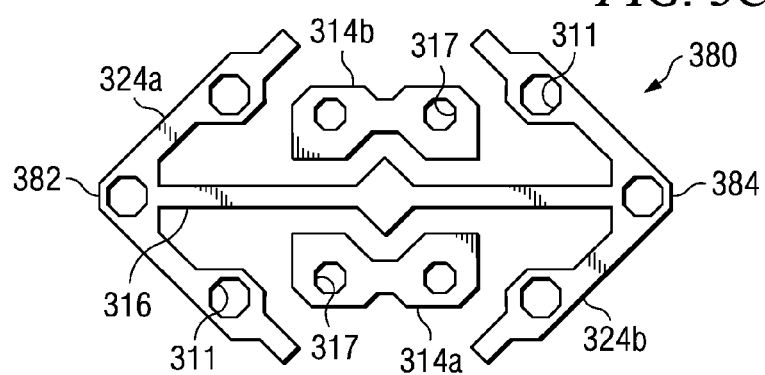
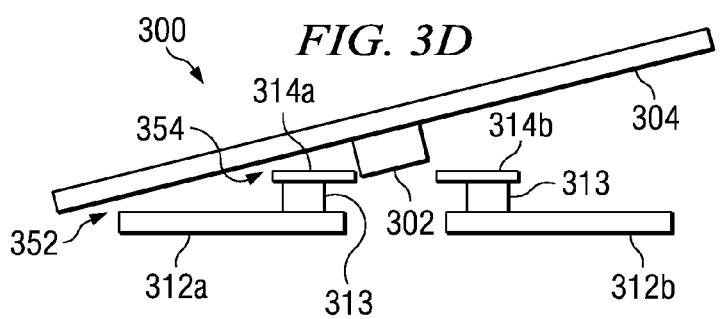

MICRO-MIRROR ELEMENT WITH DOUBLE BINGE

TECHNICAL FIELD OF THE INVENTION

This invention relates in general to image display systems, and more particularly to a micro-mirror element with double binge.

BACKGROUND OF THE INVENTION

Light processing systems often involve directing light towards a display such that an image is produced. One way of effecting such an image is through the use of digital micro-mirror devices (DMD) available from Texas Instruments. In general, light is shined on a DMD array having numerous micro-mirrors. Each micro-mirror is selectively controlled to reflect the light towards a particular portion of a display, such as a pixel. The angle of a micro-mirror can be changed to switch a pixel to an "on" or "off" state. The micro-mirrors can maintain their "on" or "off" state for controlled display times.

SUMMARY OF THE INVENTION

According to one embodiment of the present invention a micro-mirror element comprises a lower layer, a first middle layer, a second middle layer, and a micro-mirror. The lower layer includes an address portion for receiving an address voltage and a bias portion for receiving a bias voltage respectively. The first middle layer is electrically coupled to the bias portion of the lower layer. The second middle layer is electrically coupled to the first middle layer. The micro-mirror is coupled to the second middle layer and comprises a reflective surface operable to selectively tilt, in response to an application of a bias voltage and an address voltage to the lower layer, to reflect a beam of light.

Certain embodiments may provide a number of technical advantages. For example, a technical advantage of one embodiment may include the capability to provide a decreased digital micro-mirror device (DMD) mirror size. Another technical advantages of another embodiments may include the capability to provide an increased DMD resolution. Other technical advantages of other embodiments may include the capability to provide a scalable DMD pixel element.

Although specific advantages have been enumerated above, various embodiments may include all, some, or none of the enumerated advantages. Additionally, other technical advantages may become readily apparent to one of ordinary skill in the art after review of the following figures, description, and claims.

BRIEF DESCRIPTION OF THE DRAWINGS

To provide a more complete understanding of the present invention and features and advantages thereof, reference is made to the following description, taken in conjunction with the accompanying figures, wherein like reference numerals represent like parts, in which:

FIG. 1 is a block diagram of one embodiment of a portion of a display system;

FIG. 2 illustrates an example configuration of a conventional digital micro-mirror device (DMD) pixel element;

FIG. 3A illustrates another configuration of a conventional digital micro-mirror device (DMD) pixel element;

FIGS. 3B and 3C generally illustrate top isolated views of components of the conventional DMD pixel element of FIG. 3A as divided into a lower layer and a middle layer, respectively;

FIG. 3D generally shows a side isolated view of a tilted micro-mirror of FIG. 3A towards an address pad and an address electrode;

FIG. 4A illustrates a DMD pixel element, according to an embodiment of the invention;

FIG. 4B shows a side isolated view of a micro-mirror tilting towards an address pad, according to an embodiment of the invention; and FIGS. 4C, 4D, 4E, and 4F illustrate top isolated views of components of the embodiment of the DMD pixel element of FIG. 4A as divided into a lower layer, a first middle layer, a second middle layer, and a micro-mirror respectively

DETAILED DESCRIPTION OF EXAMPLE EMBODIMENTS

It should be understood at the outset that although example implementations of embodiments of the invention are illustrated below, the present invention may be implemented using any number of techniques, whether currently known or in existence. The present invention should in no way be limited to the example implementations, drawings, and techniques illustrated below. Additionally, the drawings are not necessarily drawn to scale.

FIG. 1 is a block diagram of one embodiment of a portion of a display system 10. In this example, display system 10 includes a light source module 12 capable of generating illumination light beams 14. Light beams 14 are directed from light source module 12 to a modulator 16. Modulator 16 may comprise any device capable of selectively communicating at least some of the received light beams along a projection light path 18. In various embodiments, modulator 16 may comprise a spatial light modulator, such as, for example, a liquid crystal display, a light emitting diode modulator, or a liquid crystal on silicon display. In the illustrated embodiment, however, modulator 16 comprises a digital micro-mirror device (DMD).

As will be described in more detail below, a DMD is a micro electro-mechanical device comprising an array of hundreds of thousands of tilting digital micro-mirrors. In a flat state, each micro-mirror may be substantially parallel to projection lens 24. From the flat state, the micro-mirrors may be tilted, for example, to a positive or negative angle corresponding to an "on" state and an "off" state. For discussion purposes, the angle at which the mirrors may tilt will be measured from projection path 18 and may be designated as theta. In particular embodiments, the micro-mirrors may tilt from +10 degrees to a −10 degrees. In other embodiments, micro-mirrors may tilt from a +12 degrees to a −12 degrees. To permit the micro-mirrors to tilt, each micro-mirror attaches to one or more hinges mounted on support posts, and spaced by means of an air gap over underlying control circuitry. The control circuitry provides the desired voltages to the respective layers, based at least in part on image data 20 received from a control module 22. In various embodiments, modulator 16 is capable of generating various levels or shades for each color received.

The electrostatic forces cause each micro-mirror to selectively tilt. Incident illumination light on the micro-mirror array is reflected by the "on" micro-mirrors along projection path 18 for receipt by projection lens 24. Additionally, illumination light beams 14 are reflected by the "off" micro-mirrors and directed on off-state light path 26 toward light dump 28. The pattern of "on" versus "off" mirrors (e.g., light and dark mirrors) forms an image that is projected by projection lens 24. As used in this document, the terms "micro-mirrors" and "pixels" are used inter-changeably.

Light source module 12 includes one or more lamps or other light sources capable of generating and focusing an illumination light beam. Although display system 10 is described and illustrated as including a single light source module 12, it is generally recognized that display system 10 may include any suitable number of light sources modules appropriate for generating light beams for transmission to modulator 16.

In particular embodiments, light source module 12 is positioned such that light beam 14 is directed at modulator 16 at an illumination angle of twice theta (where theta is equal to the degree of tilt of the micro-mirror). For example, where the micro-mirrors tilt from approximately +10 to +12 degrees ("on") to approximately −10 to −12 degrees ("off"), light beam 14 may be directed at modulator 16 from light source module 12 positioned at an angle of approximately +20 to +24 degrees from projection path 18. Accordingly, light beam 14 may strike modulator 16 at an angle of approximately +20 to +24 degrees relative to the normal of the micro-mirrors when the micro-mirrors are in a flat state or an untilted position.

Off state light path 26 is at a negative angle that is approximately equal to four times theta. Thus, where the micro-mirrors are positioned at approximately −10 to −12 degrees when in the "off" state, light beam 14 is reflected at an angle of approximately −40 to −48 degrees as measured from projection path 18.

As discussed above, display system 10 includes a control module 22 that receives and relays image data 20 to modulator 16 to effect the tilting of micro-mirrors in modulator 16. Specifically, control module 22 may relay image data 20 that identifies the appropriate tilt of the micro-mirrors of modulator 16. For example, control module 22 may send image data 20 to modulator 16 that indicates that the micro-mirrors of modulator 16 should be positioned in the "on" state. Accordingly, the micro-mirrors may be positioned at a tilt angle on the order of approximately +10 to +12 degrees, as measured from projection path 18. Alternatively, control module 22 may send image data 20 to modulator 16 that indicates that the micro-mirrors should be positioned in the "off" state. As such, the micro-mirrors may be positioned at a tilt angle on the order of approximately −10 to −12 degrees, as measured from projection path 18.

Figure 2:
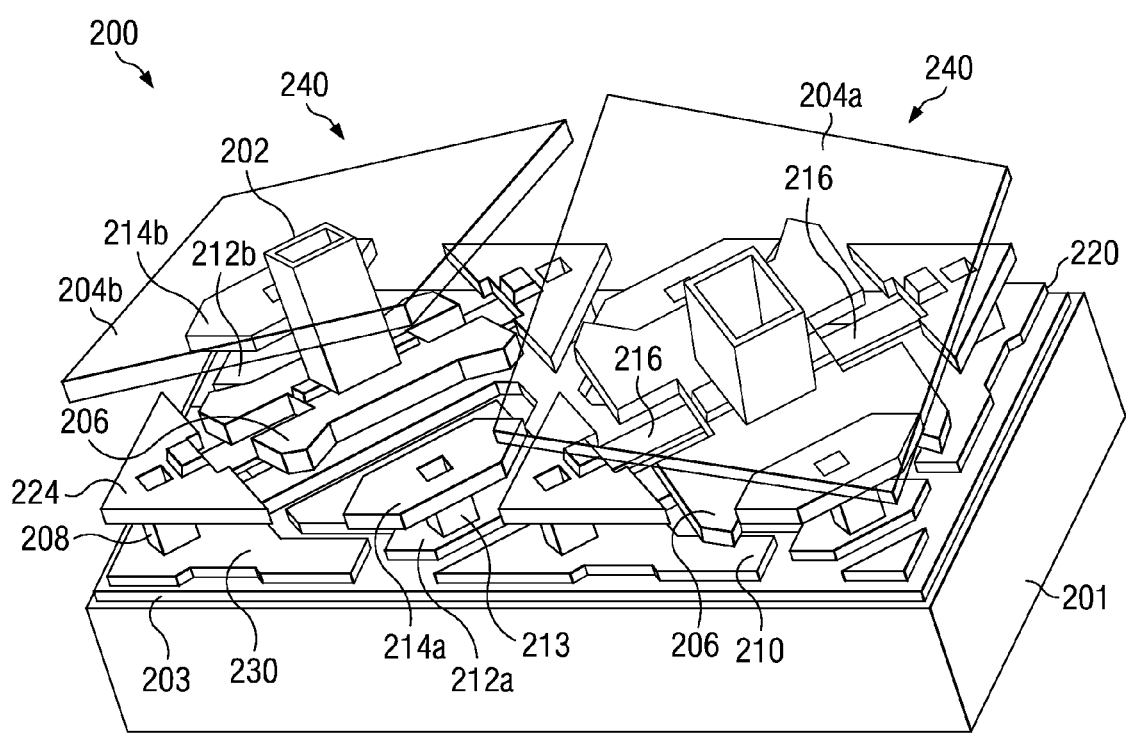

FIG. 2 illustrates an example configuration of a conventional DMD pixel element 200. As discussed above with regard to modulator 16 of FIG. 1, DMD 200 may include an array of hundreds of thousands of tilting digital micro-mirrors. Each micro-mirror may be on an individually addressable DMD pixel element 240. Although DMD 200 includes many of such DMD pixel elements 240, for illustration purposes, only two DMD pixel elements 240 are shown in FIG. 2.

Each DMD pixel element 240 may generally include a superstructure cell fabricated monolithically over a complementary metal-oxide semiconductor ("CMOS") substrate 201. In particular embodiments, the CMOS substrate 201 includes component parts of control circuitry operable to manipulate the DMD pixel element 240. For example, the CMOS substrate 201 may include an SRAM cell or other similar structure for performing the operations of DMD pixel element 240. Each DMD pixel element 240 may generally include a mirror portion, a hinge portion, and an address portion.

The mirror portion of the DMD pixel elements 240 in the illustrated embodiment uses a reflective material such as aluminum or other material to reflect incident light to produce an image through projection lens 24. In some embodiments, the reflective material may be a micro-mirror 204. In particular embodiments, the micro-mirror 204 may be approximately 13.7 microns in size and have approximately a one micron gap between adjacent micro-mirrors. The described dimensions, however, are merely one example configuration of micro-mirrors 204. It is generally recognized that, in other embodiments, each micro-mirror 204 may be smaller or larger than the above described example. For example, in particular embodiments, each micro-mirror may be less than thirteen microns in size. In other embodiments, each micro-mirror may be approximately seventeen microns in size.

The hinge portion of the DMD pixel elements 240, in the illustrated embodiment, includes one or more hinges 216 mounted with beams 224, which are supported by hinge posts or hinge vias 208. The hinges 216 may be made of aluminum, titanium, tungsten, aluminum alloys, such as AlTiO, or other material suitable for supporting and manipulating micro-mirrors 204. In operation, the one or more hinges 216 may be used to tilt each micro-mirror 204 such that the micro-mirrors 204 may be alternated between an active "on" state or an active "off" state. For example, and as described above with regard to FIG. 1, hinges 216 may operate to tilt micro-mirrors 204 from a plus ten degrees to a minus ten degrees to alternate the micro-mirrors 204 between the active "on" state condition and the active "off" state condition, respectively. In other example embodiments, however, hinges 216 may operate to tilt micro-mirrors 204 from a plus twelve degrees to a minus twelve degrees to alternate the micro-mirrors 204 between the active "on" state and the active "off" state, respectively.

The micro-mirrors 204 are generally supported above the hinge 216 by a mirror via 202. In the illustrated embodiment, the range of motion given to micro-mirrors 204 may be limited by a yoke 206. Thus, micro-mirrors 204 may be tilted in the positive or negative direction until the yoke 206 (coupled to or integrated with the hinge 216) contacts a contact point 210 of a bias pad 230. Although this example includes yoke 206, however, for limiting the motion of micro-mirrors 204 to a desired range, it is generally recognized that other embodiments may eliminate the yoke 206. For example, it is generally recognized that micro-mirrors 204 may tilt in the positive or negative direction until the micro-mirrors 204 contact a mirror stop or spring tip (shown and described in more detail with regard to FIGS. 3B–3C).

The address portion of the DMD pixel elements 240, in the illustrated embodiment, includes a pair of address pads 212a, 212b and address electrodes 214a, 214b. Address vias 213 may generally couple the address electrodes 214a, 214b to a portion of the address pads 212a, 212b. The address electrodes 214a, 214b that carry a control or address voltage are in closer proximity to the micro-mirrors 204 when the mirrors tilt. Further details of the control or address voltage are described below.

In the illustrated embodiment, the address pads 212a, 212b and the bias pad 210 are formed within a conductive layer 220 (also referred to sometimes as a Metal 3 or M3 layer). The conductive layer 220 is disposed outwardly from an oxide layer 203, which operates as an insulator. For example, the oxide layer 203 may at least partially insulate CMOS substrate 201 from address pads 212a, 212b and bias pad 210. As another example, the oxide layer 203 may additionally or alternatively operate to at least partially insulate the address electrodes 212a, 212b from the bias pad 230.

In operation, portions of the DMD pixel elements 240 may receive a bias voltage that at least partially contributes to the creation of the electrostatic forces (e.g., a voltage differential) between the address portions, which includes the address pads 212 and the address electrodes 214, and the micro-mirrors 204. Additionally or alternatively, the bias voltage may contribute to the creation of electrostatic forces between the address portions of the DMD pixel elements 240 and the yoke 206. For example, a bias voltage may be applied to the bias pad 230. The bias voltage may conductively travel from bias pad 230 through hinge vias 208, hinge 216, yoke 206, and mirror via 202 to micro-mirror 204. In particular embodiments, the bias voltage comprises a steady-state voltage. That is, the bias voltage applied to portions of the DMD pixel element 240 remains substantially constant while the DMD 200 is in operation. In particular embodiments, the bias voltage is on the order of approximately twenty-six volts. However, the described bias voltage is merely one example of a bias voltage that may be used to operate DMD 200. It is generally recognized that other bias voltages may be used without departing from the scope of the present disclosure.

As described above, CMOS substrate 201 comprises control circuitry associated with DMD 200. The control circuitry may comprise any hardware, software, firmware, or combination thereof capable of at least partially contributing to the creation of the electrostatic forces between the address portions (e.g., the address pad 212 and the address electrodes 214) and the micro-mirrors 204 and/or the address portions and the yoke 206. The control circuitry associated with CMOS substrate 201 functions to selectively transition micro-mirrors 204 between "on" and "off" states based at least in part on data received from a controller or processor (shown in FIG. 1 as reference numeral 22).

The illustrated example embodiment includes two micro-mirrors 204 disposed adjacent to one another. Micro-mirror 204a may represent a micro-mirror in the active "on" state condition. Conversely, micro-mirror 204b may represent a micro-mirror in the active "off" state condition. Thus, the control circuitry associated with CMOS substrate 201 transitions micro-mirrors 204 between "on" and "off" states by selectively applying an address or control voltage to at least one of the address electrodes 212a, 212b associated with a particular micro-mirror 204. In particular embodiments, the control voltage is on the order of approximately three volts. Accordingly, to transition micro-mirror 204b, for example, to the active "on" state condition, the control circuitry removes the control voltage from electrode 212a (reducing, for example, electrode 212a from three volts to zero volts) and applies the control voltage to electrode 212b (increasing, for example, electrode 212b from zero volts to three volts) while the micro-mirror receives reset voltages. During such activity, at least a portion of an electrostatic force (or voltage differential) may be created between the yoke 206 and the address electrode 212a. Similarly, another portion of an electrostatic force may be created between the micro-mirror 204a and the elevated address electrode 214a. The combination of the electrostatic forces may selectively create a torque force that transitions the micro-mirror 204b to the active "on" state. Although a control voltage of three volts is described above, a control voltage of three volts is merely one example of a control voltage that may be selectively applied to address electrodes 212a, 212b. It is generally recognized that other control voltages may be used without departing from the scope of the present disclosure.

By combining the DMD 200 with a suitable light source and projection optics (described above with regard to FIG. 1), the micro-mirror 240 may reflects incident light either into or out of the pupil of the projection lens 24. Thus, the "on" state of the DMD pixel element 240 appears bright and the "off" state of the DMD pixel element 240 appears dark. Gray scale may be achieved by binary pulse width modulation of the incident light. Color may be achieved by using color filters, either stationary or rotating, in combination with one, two, or three DMDs 200.

Figure 3A:
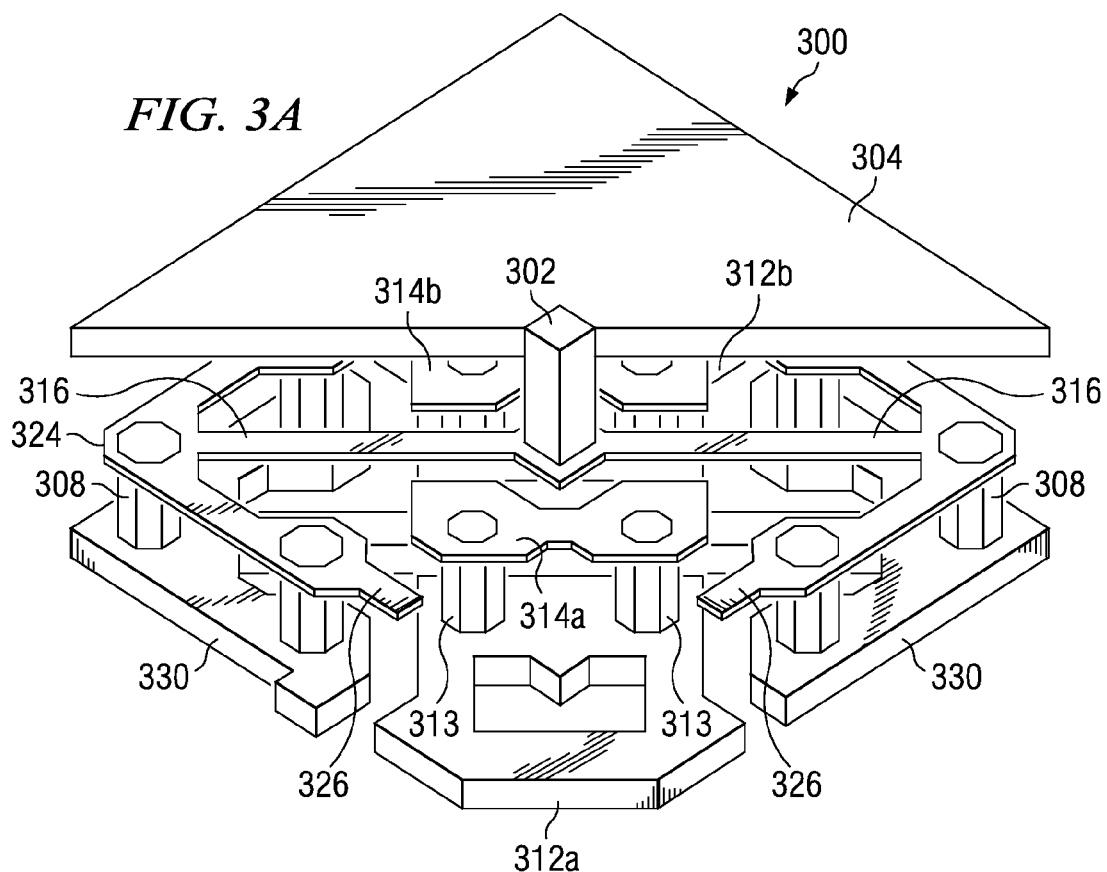

FIGS. 3A–3D illustrate additional details of another conventional DMD pixel element 300. Although a different configuration than DMD pixel element 200 of FIG. 2, the assembled DMD pixel element 300 that is illustrated in FIG. 3A may operate in a similar manner to the DMD pixel element 200. For example, similar to the DMD pixel element 200, the DMD pixel element 300 of FIG. 3 may include a hinge portion, an address portion, and a mirror portion. Although some components within the hinge portion, the address portion, and the mirror portion may remain the same, the configuration of other components within each portion may vary slightly from that described above with regard to FIG. 2. For example, in the illustrated embodiment, the mirror portion includes a micro-mirror 304, which may be similar or different than the micro-mirror 204 of FIG. 2.

The hinge portion includes a hinge 316, supported on each side by hinge posts. As will be described in more detail with regard to FIG. 3B, six bias vias 308 support spring tips 326 and hinge 316 above the lower layer 360. The bias vias 308 may also operate to relay a bias voltage to hinge 316. Micro-mirror 304 is supported above the hinge 316 upon a single mirror via 302. In addition to providing support for the micro-mirror 304, the mirror via 302 may conductively transfer the bias voltage to the micro-mirror 304. Accordingly, in a manner similar to that described above, a bias voltage may be applied to the bias pad 330. The bias voltage may then be conductively transferred to the spring tips 326 and hinge 316 through the six bias vias 308. The bias voltage may be then further transferred from the hinge 316 to the micro-mirror 304 through the mirror via 302.

The address portion of the DMD pixel element 300 includes two address pads 312a, 312b that each connect to raised address electrodes 314a, 314b, respectively. Address pads 312a, 312b and the raised address electrodes 314a, 314b are illustrated in more detail with respect to FIGS. 3B and 3C, respectively. As illustrated in FIG. 3A, address vias 313 support the raised address electrodes 314a, 314b above each address pad 312a, 312b. In addition to supporting the raised address electrodes 314a, 314b, the address vias 313 relay a control or address voltage from the address pads 312a, 312b to the raised address electrodes 314a, 314b. In a manner similar to that described above with reference to FIG. 2, the address pads 312a, 312b may be in communication with a control circuitry, such as an SRAM cell or the like, which selectively applies a control or address voltage to one of the two address pads 312a, 312b to create an electrostatic force between the micro-mirror 304 and the raised address electrodes 314a, 314b. A similar electrostatic force may be created between the micro-mirror 304 and the address pads 312a, 312b.

The range of motion allowed to micro-mirrors 304 may be limited by spring tips 326. During operation of DMD pixel element 300, spring tips 326 provide a landing point for micro-mirror 304. For example, when micro-mirror 304 is tilted in the direction of the raised address electrode 314*a* and address pad 312*a*, one or more spring tips 326 positioned proximate these address elements may operate as a landing point for micro-mirror 304. Conversely, when micro-mirror 304 is tilted in the direction of the raised address electrode 314*b* and address pad 312*b*, one or more spring tips 326 positioned proximate these address elements may operate as a landing point for micro-mirror 304. Thus, micro-mirror 304 may be tilted in the positive or negative direction until the micro-mirror 304 contacts one or more spring tips 326.

FIGS. 3B and 3C illustrate top isolated views of the components of the conventional DMD pixel element 300 of FIG. 3A as divided into a lower layer 360 and an upper layer 380, respectively. Although the term "layer" is utilized in this description, it is recognized that the component parts of lower layer 360 may not necessarily lie in the same plane. Specifically, FIG. 3B illustrates a top isolated view of the lower layer 360, which may also be referred to as a Metal 3 or M3 layer, of the DMD pixel element 300. The DMD pixel element 300 is substantially configured in the shape of a square. Accordingly, the components of the lower layer 360 are also substantially configured in the shape of a square. There are two bias pads 330*a* and 330*b* that are coupled by an arm 365 that extends substantially across the width of the lower layer 360. For the application of a bias voltage, bias pads 330 include areas 308 that identify the proximate location for the formation of bias vias 308 (shown in FIG. 3A). Each bias pad 330 includes three areas 309 for the formation of three bias vias 308. Collectively, bias pads 330*a*, 330*b* include six areas 309 for the formation of six bias vias 308.

Lower layer 360 also includes two address pads 312*a* and 312*b* separated by an arm 365. For the application of a control voltage, address pads 312*a*, 312*b* include areas 315 that identify the proximate location for the formation of address vias 313 (shown in FIG. 3A). Each address pad 312 includes two areas 315 for the formation of two address vias 313. Accordingly, address pads 312*a*, 312*b* collectively include four areas 315 for the formation of four address vias 313.

FIG. 3C illustrates a top isolated view of a middle layer 380, which may also be referred to as beam/hinge or "binge" layer, of the DMD pixel element 300 of FIG. 3C. Although the term "layer" is utilized in this description, it is recognized that the component parts of middle layer 380 may not necessarily lie in the same plane. As illustrated in FIG. 3A, the size and shape of middle layer 380 corresponds generally with the size and shape of lower layer 360.

The middle layer 380 includes four spring tips 326, two beams 324*a*, 324*b*, a hinge 316, and two address electrodes 314*a*, 314*b*. A first beam 324*a* is disposed proximate a first corner 382 of middle layer 380, and a second beam 324*b* is disposed proximate a second corner 384 of middle layer 380. As illustrated, the hinge 316 extends substantially across the width of the middle layer 380. For coupling the bias pads 330 of the lower layer 360 with beams 324, each beam 324*a*, 324*b* includes areas 311 that identify the proximate location for the formation of bias vias 308 (shown in FIG. 3A). Accordingly, where three bias vias 308 are desired for supporting each beam 324*a*, 34*b*, each beam 324*a*, 324*b* includes three areas 311 for the formation of bias vias 308. As described above, a bias voltage applied to the bias pads 330 of the lower layer 360 may be transferred to beams 324 through bias vias 308.

The middle layer 380 also includes two raised address electrodes 314*a* and 314*b*, which are disposed on each side of hinge 316. For coupling the address pads 312 of the lower layer 360 to the address electrodes 314 of the middle layer 380, address electrodes 314*a*, 314*b* include areas 317 that identify the proximate location for the formation of address vias 313 (shown in FIG. 3A). Each address electrode 314*a*, 314*b* includes two areas 317 for the formation of two address vias 313. Accordingly, address electrodes 314*a*, 314*b* collectively include four areas 317 for the formation of four address vias 313. As described above, a control voltage applied to the address pads 312 of the lower layer 360 may be transferred to address electrodes 314 through address vias 313. The control voltage may then be transferred to an upper layer, which comprises the micro-mirror 304, for the selective tilting of micro-mirror 304 to an "off" state or an "on" state.

FIG. 3D generally shows a side isolated view of a tilting of the micro-mirror of FIG. 3A towards address pad 312*a*/address electrode 314*a*. For purposes of illustration, other component parts of the DMD pixel element 300 have been removed. The mirror 304 may be charged with a bias voltage. Absent any application of voltage, both the 312*a*/address electrode 314*a* and 312*b*/address electrode 314*b* may have a charge of zero volts. Address pad 312*b*/address electrode 314*b* upon being selected by control circuitry (not explicitly shown) may receive a control or address voltage of three volts. A greater electrostatic attraction between the mirror and the address pad 312*a*/raised address electrode 314*a* may tilt the mirror (via the hinge 316, seen better in FIG. 3A) towards the address pad 312*a*/address 314*a*. Arrows 352 and 354 are two locations where strong electrostatic forces are created, for example, between the address pad 312*a* and the micro-mirror 304 (arrow 352) and the raised address electrode 314*a* and the micro-mirror 304 (arrow 354).

The mirror may be tilted in a similar manner towards address pad 312*b*/address electrode 314*b* by applying three volts to the address pad 312*a*/address 314*a* and removing the three volts from the address pad 312*b*/address 314*b*, for example, to return the address pad 312*b*/address 314*b* to a voltage of zero. Although three volts has been been described as the control or address voltage in this embodiment, other voltages may be utilized to create a greater electrostatic differential on one side of the micro-mirror 304 in other embodiments. For example, the control or address voltage may be a negative voltage.

Each micro-mirror of a DMD array may correspond to a pixel in a displayed image. For a variety of reasons, it may be desirable to decrease the size of a DMD pixel element. For example, given a fixed die size for a DMD array, a decrease in the size of the DMD pixel element may increase the resolution. Additionally, given a fixed number of micro-mirrors in a DMD array, a decrease in the size of the DMD pixel elements may decrease the size of the die for the DMD array, which in turn may increase the production yield (e.g., more chips per wafer). A simple scaling of some DMD pixel elements such as the DMD pixel element 300 of FIG. 3A to a smaller size may be infeasible in certain circumstances. For example, among other items, a scaling of the DMD pixel element 300 of FIG. 3A to a reduced size may necessitate lower electrostatics (e.g., less electrostatic force to tilt the micro-mirror 304 about hinges 316), thinner hinges 316 (e.g., to allow the micro-mirror to tilt properly), and higher aspect ratio vias between the lower layer 330 and the middle layer 380 (e.g, when the vias are shrunk, they might not function properly). Additionally resistance in the mirror via 302 may increase as the micro-mirror gets 304 smaller. Furthermore, a lower vertical space between the micro-mirror 304 and the middle layer 380 may result in electrical shorting—e.g., in the areas indicated by arrows 352 and 354—due to different voltage levels between the micro-mirror 304 and the address pad 312a or 312b and the micro-mirror 304 and the address electrodes 314a or 314b. Furthermore, air damping between the layers may become an issue. Additionally, the elevated address electrode 314a, 314b may not receive a suitable address voltage if the shrunken address vias 313 are not sized large enough to be fully conductive. Accordingly, teachings of embodiments of the invention recognize configurations which may facilitate smaller DMD pixel element designs.

Figure 4A:
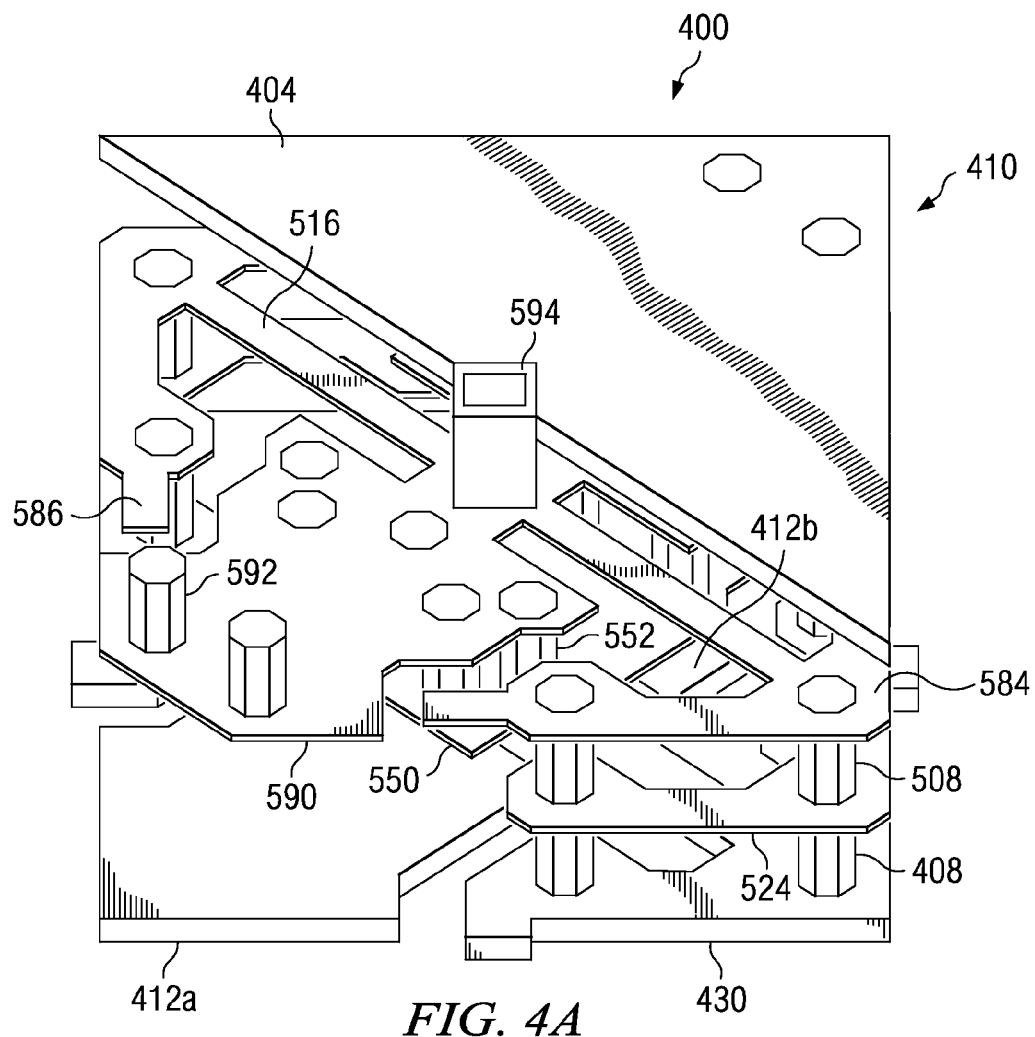

FIG. 4A illustrates a DMD pixel element 400, according to an embodiment of the invention. For purposes of illustration, the micro-mirror 404 has been partially ghosted in FIG. 4A. The DMD pixel element 400 of FIG. 4A may operate in a similar manner to the DMD pixel elements of FIGS. 1 through 3D except for the differences described below. The DMD pixel element 400 may include a lower layer 460, two middle layers 520 and 580, and a mirror layer 410.

The lower layer 460 includes two address pads 412a, 412b. In a manner similar to that described above with reference to FIGS. 2 and 3A, the address pads 412a, 412b may be in communication with a control circuitry (e.g., SRAM cell or the like) which selectively applies a control or address voltage to one of the two address pads 412a, 412b to create an electrostatic force between the micro-mirror 404 and one of the address pads 412a, 412b; the first rotating beam 550 and one of the address pads 412a, 412b; and/or the second rotating beam 590 and one of the address pads 412a, 412b. In operation, the electrostatic force forces rotation of the micro-mirror 404, the first rotating beam 550, and the second rotating beam 590 to one of the address pads 412a, 412b. In some embodiments, the entire structure of the DMD pixel element 400 other than the address pad 412a, 412b may receive a bias voltage.

The two middle layers 520 and 580 of the DMD pixel element 400 may include one or more hinges 516, a first rotating beam 550, and a second rotating beam 590. The first rotating beam 550 and second rotating beam 590 are respectively located in a first middle layer 520 and a second middle layer 580. The first middle layer 520 is described in further detail below with reference to FIG. 4D and the second middle layer 580 is described in further details below with reference to FIG. 4E. The one or more hinges 516 may be at least partially supported on each side by a second beam 584, which is supported above a first beam 524 through a plurality of second bias vias 508. The first beam 524 is supported above a bias pad 430 with a plurality of first bias vias 408. The second rotating beam 590 may be coupled to the one or more hinges 516. The first rotating beam 550 may be coupled to the second rotating beam 590 with first rotating beam vias 552.

In operation, the first rotating beam 550 and the second rotating beam 590 may rotate with the one or more hinges 516. Six first bias vias 408 support the first beam 524, and six second bias vias 508 support the second beam 584, the one or more hinges 516, the first rotating beam 550, and the second rotating beam 590 above the lower layer 460 (described in further details with reference to FIG. 4C). The bias voltage may be applied to the bias pad 430 and relayed to the first beam 524 through the first bias vias 408. The bias voltage may then be relayed to the second beam 584, one or more hinges 516 and the second rotating beam 590 through the second bias vias 508. The bias voltage may then be relayed to the micro-mirror 404 through one or more mirror vias 594 and 592. The bias voltage may additionally be relayed to the first rotating beam 550 from the second rotating beam 590 through the first rotating beam vias 552.

The spring tips 586 on the edge of the second beam 584 may provide a landing point for the micro-mirror 404 upon tilting towards one of the address pad 412a, 412b. The spring tips 586 may be modified to facilitate a desired tilt angle of the micro-mirror 404. For example, in this embodiment, the spring tips 586 may allow a tilt of plus or minus twelve degrees. In other embodiments, the spring tips may allow a tilt of more than or less than plus or minus twelve degrees. Although the spring tips are shown on the edge of the second beam 584, in other embodiments the spring tips may be on the edge of the first beam 524.

The mirror layer 410 includes a micro-mirror 404, which may be similar or different from the micro-mirrors 204, 304 of FIGS. 2 and 3A. The single mirror via 302 of FIG. 3A has been replaced with a plurality of mirror vias 594 and 592. The micro-mirror 404 of FIG. 4A is supported above the hinge 516 upon the mirror vias 594 and 592 (four mirror vias 592 are shown in this embodiment). The mirror vias 592 couple the micro-mirror 404 to the second rotating beam 590. In some embodiments, the center mirror via 594 may be removed and the micro-mirror 404 may only be supported by the mirror vias 592. The plurality of mirror vias 592 may reduce variability in electrical resistance and increase mechanical integrity of the mirror via, for example, as compared to the single mirror via 302 of FIG. 3A. Although four mirror vias 592 are shown in this embodiment, more or less mirror vias may be utilized in other embodiments. The mirror vias 592 and 594, in addition to providing support for the micro-mirror 404, may conduct a bias voltage to the micro-mirror 404.

Figure 4B:
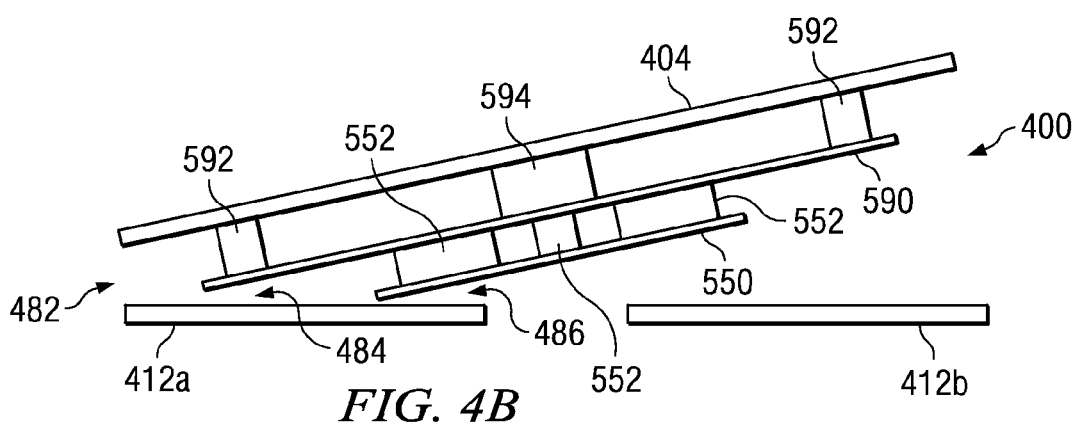

FIG. 4B shows a side isolated view of a micro-mirror 404 tilting towards an address pad 412a, according to an embodiment of the invention. For purposes of illustration, other component parts of the DMD pixel element 400 are not shown. The micro-mirror 404, the mirror vias 594 and 592, the second rotating beam 590, the first rotating beam vias 552, and the first rotating beam 550 may be charged with a bias voltage. Address pad 412b upon selection by the control circuitry (not explicitly shown) may receive a control or address voltage. As a result of this selection, address pad 412a may have a lower voltage than address pad 412b (e.g., zero volts). A greater electrostatic difference between the assembly of the micro-mirror 404/the first rotating beam 550/the second rotating beam 590 and the address pad 412a may tilt the micro-mirror 404, first rotating beam 550, and second rotating beam 590 towards the address pads 412a (via the hinge 516, seen better in FIG. 4A). Arrows 482, 484, and 486 indicate three areas where electrostatic forces are stronger, for example, between the address pad 412a and the micro-mirror 404 (arrow 482), the address pad 412a and the second rotating beam 590 (arrow 484), and the address pad 412a and the first rotating beam 550 (arrow 486).

The micro-mirror 404, first rotating beam 550, and second rotating beam 590 may be tilted in a similar manner towards address pad 412b by applying a control or address voltage to the address pad 412a and zero volts to the address pad 412b.

Figure 4C:
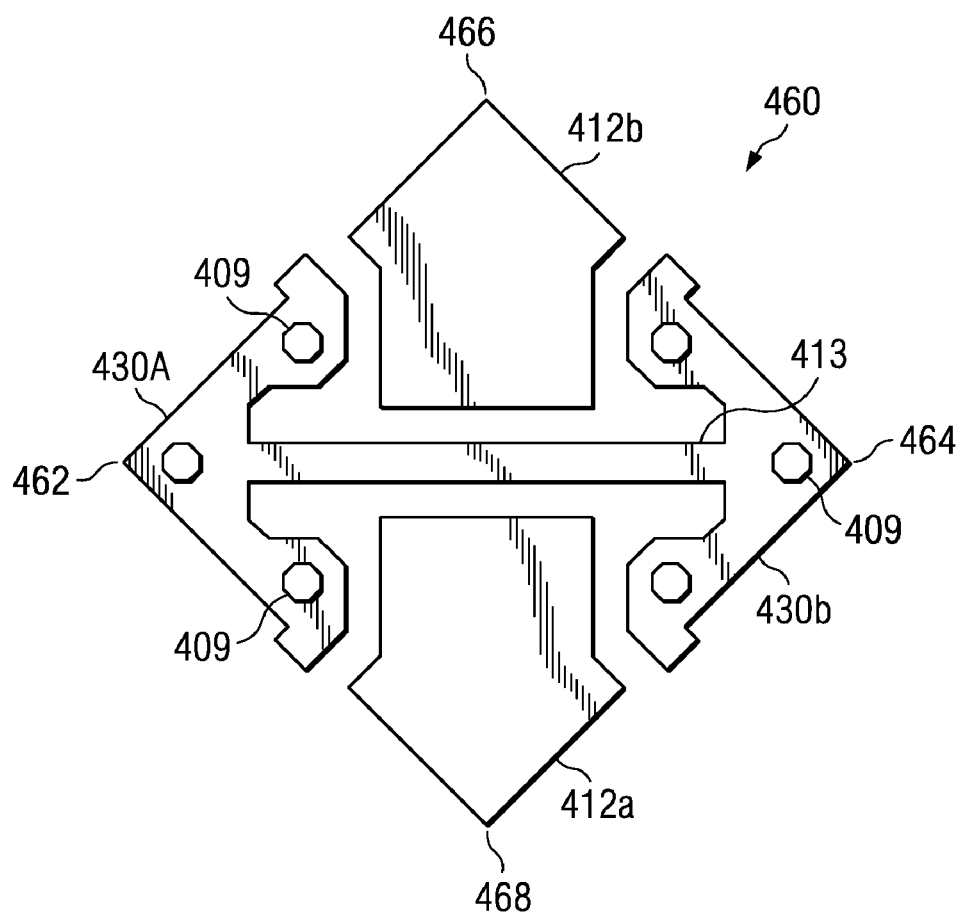

FIGS. 4C, 4D, 4E, and 4F illustrate top isolated views of the components of the embodiment of the DMD pixel element 400 of FIGS. 4A and 4B as divided into a lower layer 460, first middle layer 520, second middle layer 580, and micro-mirror 404, respectively. FIG. 4C illustrates a top isolated view of the lower layer 460, which may also be referred to as Metal 3 or M3 layer. Although the term "layer" is utilized in this description, the component parts in lower layer 460 may not necessarily be in the same plane. The lower layer 460 of FIG. 4C includes the bias pad portions 430A, 430B and the address pads 412a, 412b. The bias pad portions 430A, 430B show areas 409 for six first bias vias 408 (not explicitly shown). The bias pad 430 may receive a bias voltage and one or more of the address pads 412a or 412b may receive an address or control voltage.

The lower layer 460 includes a first corner 462, a second corner 464, a third corner 466, and a fourth corner 468. The first corner 462 and the second corner 464 are edges of the bias pad 430. The third corner 466 is at an edge of the bias pad 412b and the fourth corner 468 is at an edge of the bias pad 412a. The bias pad portions 430A, 430B are conductively connected to one another via an arm 413. The center of the arm in this embodiment is roughly the center of the DMD pixel element 400.

Figure 4D:
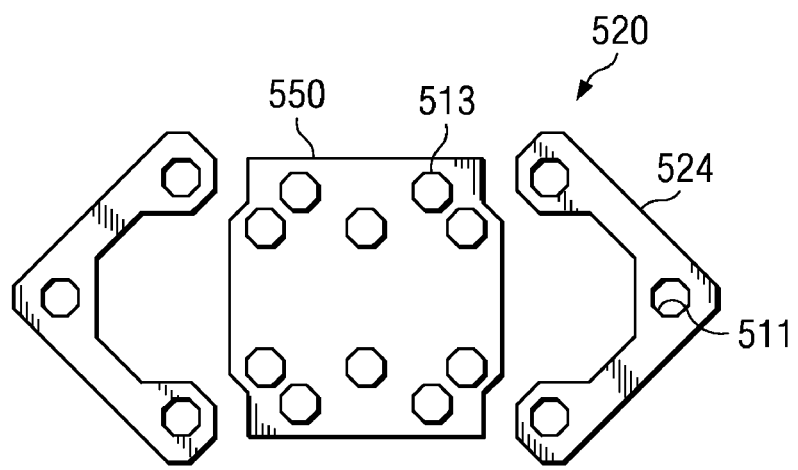

FIG. 4D illustrates a top isolated view of a first middle layer 520 (also referred to as beam/hinge or "binge" layer) of the DMD pixel element 400 of FIG. 4A. Once again, although the term "layer" is utilized in this description, the component parts in the first middle layer 520 may not necessarily be in the same plane. The first middle layer 520 includes the beams 524 and the first rotating beam 550. Areas 511 identify the locations of the six first bias vias 408 that may be coupled with the second bias vias 508. Although areas 511 have been described in the specific areas, different areas may be utilized for each of the first bias vias 408 and the second bias vias 508 in other embodiments. The first rotating beam 550 includes areas 513 that identify the locations of the first rotating beam vias 552. The entire first middle layer 520 may receive the bias voltage.

Figure 4E:
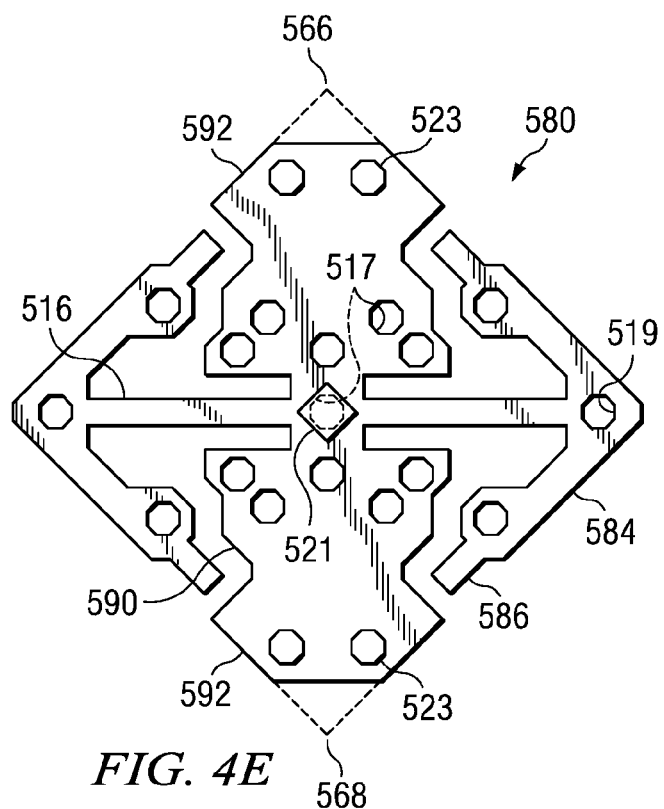

FIG. 4E illustrates a top isolated view of a second middle layer 580 (also referred to as beam/hinge or "binge" layer) of the DMD pixel element 400 of FIG. 4A. Once again, although the term "layer" is utilized in this description, the component parts in the middle layer 580 may not necessarily be in the same plane. The middle layer 580 includes the second beams 584, the hinge 516, and the second rotating beam 590. Areas 519 identify the locations of the second bias vias 508. Areas 517 shown on the second rotating beam 590 identify the locations of the first rotating beam vias 552. Areas 523 and 521 for mirror vias 592 and 594. Each edge 592 of the second rotating beam 590 may extend towards a third corner 566 and a fourth corner 568. The third corner 566 may be above the third corner 466 and the fourth corner 568 may be above the fourth corner 468. Thus, as can be seen with reference to FIGS. 4C, 4D, and 4E, the second rotating beam 590 may extend laterally further away from the center of the DMD pixel element 400 than the first rotating beam 550. The entire second middle layer 580 (e.g., the second beam 584, the hinge 516, and the second rotating beam 590) may receive the bias voltage.

Figure 4F:
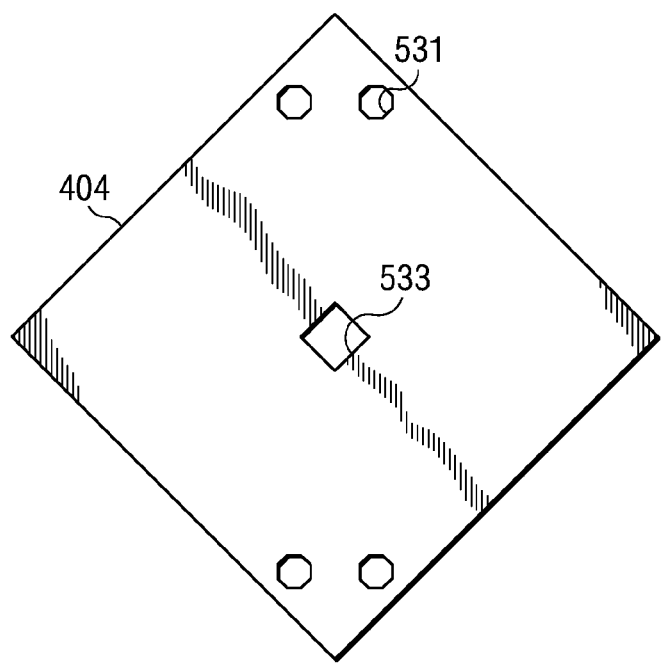

FIG. 4F illustrates a top isolated view of the micro-mirror 404 of the DMD pixel element 400 of FIG. 4A. The micro-mirror 404 may include areas 531 and 533 that identify the locations of mirror vias 594 and 592.

The embodiments shown in FIGS. 4A through 4F may facilitate a scalable DMD pixel design that allows lower electrostatics and smaller interaction areas (e.g., between the bias portion and address portion) in a reduced sized DMD pixel element. The first rotating beam 550 (in a similar location to the raised address electrodes 314a, 314b of FIG. 3A) does not receive an address voltage, but rather receive a bias voltage. Additionally, the second rotating beam 590 extending substantially to a third corner 566 and a fourth corner 568 facilitates an electrostatic force between the second rotating beam 590 and one of the address pads 412a or 412b. Thus, both the second rotating beam 590 and the first rotating beam 550 facilitate taking a bias voltage down to a lower height at multiple points. With the embodiments shown in FIGS. 4A through 4F an electrostatic forces may be created at three separate locations—e.g., between the address pad 412a and the micro-mirror 404 (arrow 482 of FIG. 4B), the address pad 412a and the second rotating beam 590 (arrow 484 of FIG. 4B), and the address pad 412a and the first rotating beam 550 (arrow 486 of FIG. 4B).

Numerous other changes, substitutions, variations, alterations, and modifications may be ascertained to one skilled in the art and it is intended that the present invention encompass all such changes, substitutions, variations, alterations, and modifications as falling within the scope of the appended claims.

What is claimed is:

1. A micro-mirror element comprising:
   a lower layer including an address portion for receiving an address voltage and a bias portion for receiving a bias voltage respectively;
   a first middle layer including a first rotating beam and a pair of bias beams, each bias beam electrically coupled to the bias portion of the lower layer by at least one via;
   a second middle layer including a hinge electrically coupled to at least one of the bias beams of the first middle layer and also including a second rotating beam electrically coupled to the hinge, the second rotating beam also electrically coupled to the first rotating beam by at least one via;
   a micro-mirror comprising a reflective surface operable to selectively tilt to reflect a beam of light, the micro-mirror electrically coupled to the second rotating beam by at least one via;
   wherein application of the bias voltage to the bias portion and the address voltage to the address portion creates a first, second, and third electrostatic attractions that collectively result in a force operable to tilt the mirror, the first electrostatic attraction being between the address portion and the first rotating beam, the second electrostatic attraction being between the address portion and the second rotating beam, and the third electrostatic attraction being between the address portion and the micro-mirror;
   wherein the first middle layer is disposed between the lower layer and the second middle layer; and
   wherein the second middle layer is disposed between the first middle layer and the micro-mirror.

2. The micro-minor element of claim 1, wherein:
   the second rotating beam is operable to receive a portion of a bias voltage received by the hinge, and
   the first rotating beam is operable to receive a portion of the bias voltage received by the second rotating beam.

3. The micro-mirror element of claim 1, wherein the first rotating beam and the second rotating beam are operable to rotate with the hinge.

4. The micro-mirror element of claim 1, wherein the second middle layer includes a second bias beam electrically coupled to hinge, the second middle layer also electrically coupled to at least one of the bias beams of the first middle layer by at least one via.

5. The micro-mirror element of claim 1, wherein the second rotating beam extends laterally further from a center of the micro-mirror than the first rotating beam.

6. The micro-mirror element of claim 1, wherein the address voltage is only applied to the lower layer.

7. A micro-mirror element comprising:
a lower layer including an address portion for receiving an address voltage and a bias portion for receiving a bias voltage respectively;
a first middle layer electrically coupled to the bias portion of the lower layer;
a second middle layer electrically coupled to the first middle layer; and
a micro-mirror coupled to the second middle layer comprising a reflective surface operable to selectively tilt, in response to an application of a bias voltage and an address voltage to the lower layer, to reflect a beam of light.

8. The micro-mirror element of claim 7, wherein
the first middle layer includes a first rotating beam,
the second middle layer includes a hinge and a second rotating beam, and
the first rotating beam and the second rotating beam are operable to rotate with the hinge.

9. The micro-mirror element of claim 8, wherein
application of the bias voltage to the bias portion and the address voltage to the address portion creates first and second electrostatic attractions resulting in at least a portion of a force operable to tilt the micro-mirror, the first electrostatic attraction being between the address portion and the first rotating beam, the second electrostatic attraction being between the address portion and the second rotating beam.

10. The micro-mirror element of claim 9, wherein
the first middle layer is disposed between the lower layer and the second middle layer; and
the second middle layer is disposed between the first middle layer and the micro-mirror.

11. The micro-mirror element of claim 9, wherein the address voltage is only applied to the lower layer.

12. The micro-mirror element of claim 8, wherein
the micro-mirror is electrically coupled to the second middle layer; and
application of the bias voltage to the bias portion and the address voltage to the address portion creates a first, second, and third electrostatic attraction that collectively result in a force operable to tilt the mirror, the first electrostatic attraction being between the address portion and the first rotating beam, the second electrostatic attraction being between the address portion and the second rotating beam, and the third electrostatic attraction being between the address portion and the micro-mirror.

13. The micro-mirror element of claim 7, wherein the address voltage is only applied to the lower layer.

14. The micro-mirror element of claim 8, wherein
the second rotating beam is operable to receive a portion of a bias voltage received by the first middle layer, and
the first rotating beam is operable to receive a portion of the bias voltage received by the second rotating beam.

15. The micro-mirror element of claim 14, wherein the first rotating beam and the second rotating beam are operable to rotate with the hinge.

16. The micro-mirror element of claim 7, wherein the second middle layer includes a bias beam electrically coupled to a hinge, the second middle layer also electrically coupled to the first middle layer by at least one via.

17. The micro-mirror element of claim 7, wherein
the second middle layer includes a second rotating beam,
the first middle layer includes a first rotating beam, and
the second rotating beam extends laterally further from a center of the micro-mirror than the first rotating beam.

18. The micro-mirror element of claim 17, wherein
the second rotating beam is operable to receive a portion of a bias voltage received by the first middle layer, and
the first rotating beam is operable to receive a portion of the bias voltage received by the second rotating beam.

19. A method of tilting a digital micro-mirror pixel element, the method comprising:
providing a micro-mirror element with a lower layer that includes an address portion, a first middle layer that includes a rotating beam, a second middle layer that includes a second rotating beam, and a micro-mirror;
applying an address voltage to the address portion;
applying a bias voltage to the first rotating beam and the second rotating beam; and
creating a first electrostatic attraction between the address portion and the first rotating beam and a second electrostatic attraction between the address portion and the second rotating beam by applying the address voltage to the address portion and the bias voltage to the first and second rotating beams respectively, wherein the first and second electrostatic attractions result in at least a portion of a force operable to tilt the micro-mirror.

20. The method of claim 19, further comprising:
applying a bias voltage to the micro-mirror;
creating a third electrostatic attraction between the address portion and the micro-mirror by applying the address voltage to the address portion and the bias voltage to the micro-mirror, wherein the third electrostatic attraction results in at least a portion of the force operable to tilt the micro-mirror.

* * * * *